United States Patent [19]
Hitz

[11] Patent Number: 6,158,575
[45] Date of Patent: Dec. 12, 2000

[54] LINKS FOR FORMING A CONNECTOR TRANSPORT CHAIN

[75] Inventor: Gary A. Hitz, New Cumberland, Pa.

[73] Assignee: Berg Technology, Inc., Reno, Nev.

[21] Appl. No.: 09/067,735

[22] Filed: Apr. 28, 1998

[51] Int. Cl.$^7$ .................................................. B65G 29/00
[52] U.S. Cl. ................. 198/803.14; 198/850; 198/803.1; 198/867.11
[58] Field of Search .......................... 198/803.1, 803.13, 198/803.14, 803.15, 850, 853, 867.1, 484.1

[56] References Cited

U.S. PATENT DOCUMENTS

| | | |
|---|---|---|
| 807,541 | 12/1905 | Cunningham et al. . |
| 958,252 | 5/1910 | Jenkins ................... 198/803.1 |
| 1,843,453 | 2/1932 | Littlefield . |
| 2,358,292 | 9/1944 | Malhiot .................... 198/131 |
| 2,935,227 | 5/1960 | Swartz ..................... 221/179 |
| 2,953,240 | 9/1960 | Nigrelli et al. ........... 198/179 |
| 3,253,512 | 5/1966 | Schallehn .................. 89/35 |
| 3,439,520 | 4/1969 | Schwartz ............. 198/803.1 X |
| 3,773,172 | 11/1973 | McClure et al. ............ 209/73 |
| 3,788,450 | 1/1974 | Tschunt et al. ........... 198/131 |
| 3,800,937 | 4/1974 | Tassie ..................... 198/131 |
| 3,983,990 | 10/1976 | Gardy et al. .............. 198/853 |
| 4,290,519 | 9/1981 | Harvey .................... 198/483 |
| 4,394,901 | 7/1983 | Roinestad ................ 198/850 |
| 4,473,365 | 9/1984 | Lapeyre ................... 474/212 |
| 4,533,038 | 8/1985 | Richard ................... 198/646 |
| 4,583,640 | 4/1986 | Gillam et al. ............ 206/328 |
| 4,638,906 | 1/1987 | Winiasz ................. 198/850 X |
| 4,753,003 | 6/1988 | Gobell ..................... 29/884 |
| 4,852,737 | 8/1989 | Noll ....................... 206/320 |
| 5,004,101 | 4/1991 | Neumann et al. ......... 206/343 |
| 5,333,733 | 8/1994 | Murata ................... 206/330 |
| 5,490,591 | 2/1996 | Faulkner .............. 198/803.13 |
| 5,526,936 | 6/1996 | Matsuzoe ................. 206/724 |

FOREIGN PATENT DOCUMENTS

| | | | |
|---|---|---|---|
| 2562-521 | 11/1985 | France ..................................... | 17/16 |
| 2594-810 | 8/1987 | France ..................................... | 17/40 |
| 3143269 A1 | 11/1983 | Germany ................................. | 15/44 |
| 57-48512 | 3/1982 | Japan ...................................... | 17/46 |
| 62-93109 | 4/1987 | Japan ...................................... | 17/32 |
| 456390 | 2/1975 | Russian Federation .................. | 3/59 |

OTHER PUBLICATIONS

Framatome Connectors Belgium N.V. Drawing Number BP, E, 201988,000,00 Dated Aug. 29, 1995.
Burndy Drawing Number (Unknown) Dated Mar. 12, 1975.

Primary Examiner—James R. Bidwell
Attorney, Agent, or Firm—Brian J. Hamilla; M. Richard Page

[57] ABSTRACT

An electrical connector link adapted to movably couple with at least one other link to form a chain that is adapted to releasably receive and transport an electrical connector from a first station to a second station is provided. The link comprises a base portion having a relative first end and a second end. The base portion is adapted to moveably couple with a second link. A first wall is integrally connected with, and extends upwardly from, the base portion proximate the first end. The first wall has an outside surface, inside surface, and top surface. The first wall is adapted to communicate with a first electrical connector and retain the connector between the first wall and a second link. A latching arm is integrally connected with, and protrudes from, the outside surface of the first wall. The latching arm is adapted to movably engage a third link. A second wall is integrally connected with, and extends upwardly from, the base portion proximate the second end. The second wall is adapted to communicate with a second electrical connector and retain the second connector between the second wall and a third link.

39 Claims, 8 Drawing Sheets

LINKS FOR FORMING A CONNECTOR TRANSPORT CHAIN

FIELD OF THE INVENTION

The present invention is related to link structures and, more particularly, to link structures for transporting electrical connectors from a first station to a second station such that the electrical connectors can be loaded into a connector magazine and, in turn, mechanically coupled to a structure.

BACKGROUND OF THE INVENTION

Automated assembly devices for mounting electrical connectors to a structure, such as a cable assembly, circuit board and the like, are well known in the art. Typically, a plurality of electrical connectors are held in a magazine relative to the assembly device. The connectors are withdrawn from the magazine and mounted to the structure by the automated assembly device.

There are at least two types of magazines that may be employed to hold a plurality of electrical connectors prior to mounting. One magazine type is the vertical or "penny stack" magazine, and the other is a horizontal or "end-to-end" stack magazine. Penny stack and end-to-end stack magazines each have a body portion including an inlet for loading the connectors, and an outlet for removing the connectors. These magazine bodies are designed to contain only a limited number of connectors.

Regardless of the type of magazine employed, the connectors usually have been manually loaded through the magazine inlet. Two of the most common manual methods for loading either type of magazine include the "tape and box" method and "tape and reel" method. The "tape and box" and "tape and reel" methods require the implementation of a substrate having an adhesive layer thereon that is adapted to releasably receive a number of electrical connectors. After attachment to the adhesive, the substrate is transported to the magazine location. The substrate and connectors are then placed through the inlet of either the penny stack or end-to-end stack magazine. After the electrical connectors are placed within the magazine, the substrate is pealed away from the connectors such that the individual connectors are arranged in the desired position to be withdrawn from the magazine outlet end. Employing an adhesive layered substrate to manually load connectors into magazines has several drawbacks.

One drawback is that after the substrate is peeled away from the connectors often adhesive residue will remain on some portion of a connector, rendering the connector useless. It would, therefore, be desirable to provide means for loading connectors into a magazine that would maintain the connectors within the transport device without the use of adhesive.

Another problem that may arise with adhesive residue on the connectors is that neighboring connectors stick to each other, thereby, causing the connectors to jam the magazine. It would, therefore, be desirable to provide a means for preventing the magazine from being jammed due to adhesive residue.

One drawback of manually loading connectors into a magazine is that the connector contact area or connector leads can be damaged during transportation and loading. It would, therefore, be desirable to provide a means of preventing electrical connectors from being damaged as they are handled and loaded into magazines.

An additional drawback of manually loading connectors is that the magazines must be reloaded each time that the magazine is emptied. It is relatively costly to have a person transport the connectors, placed on an adhesive layered substrate, to the magazine; and reload the magazine each time that the magazine is emptied. It would, therefore, be desirable to reduce the costs that are required to load and reload connector magazines.

SUMMARY OF THE INVENTION

A link adapted to movably couple with at least one other link to form a chain that is adapted to releasably receive and transport a plurality of like elements, such as electrical connectors from a first station to a second station is provided. The link comprises a base portion having a relative first end and a second end. The base portion is adapted to moveably couple with a second link. A first wall is integrally connected with, and extends upwardly from, the base portion proximate the first end. The first wall has an outside surface, inside surface, and top surface. In one form, the first wall is adapted to retain the element between the first wall and a second link. A latching arm is integrally connected with, and protrudes from, the outside surface of the first wall. The latching arm is adapted to movably engage a second link. A second wall is integrally connected with, and extends upwardly from, the base portion proximate the second link. The second wall is adapted to engage the element and retain the element between the second wall and the first wall.

In a second form, the link includes a base with a first and second wall. The first and second walls are opposed and includes structure for releasably retaining an element between them. A latching arm from an adjacent link is pivotally received in a space between the opposing walls. The latching arm can release the element from between the two walls as adjacent links pivot with respect to each other.

The links provide a packaging system for elements, which packaging system can be recycled for reloading. The links are easily separable to allow replacement of broken links.

DETAILED DESCRIPTION OF THE PREFERRED EMBODIMENTS

The present invention has applicability to transfer systems for like-shaped parts. As it was developed primarily for use with electrical connectors, the following description is in that context.

Figure 1:
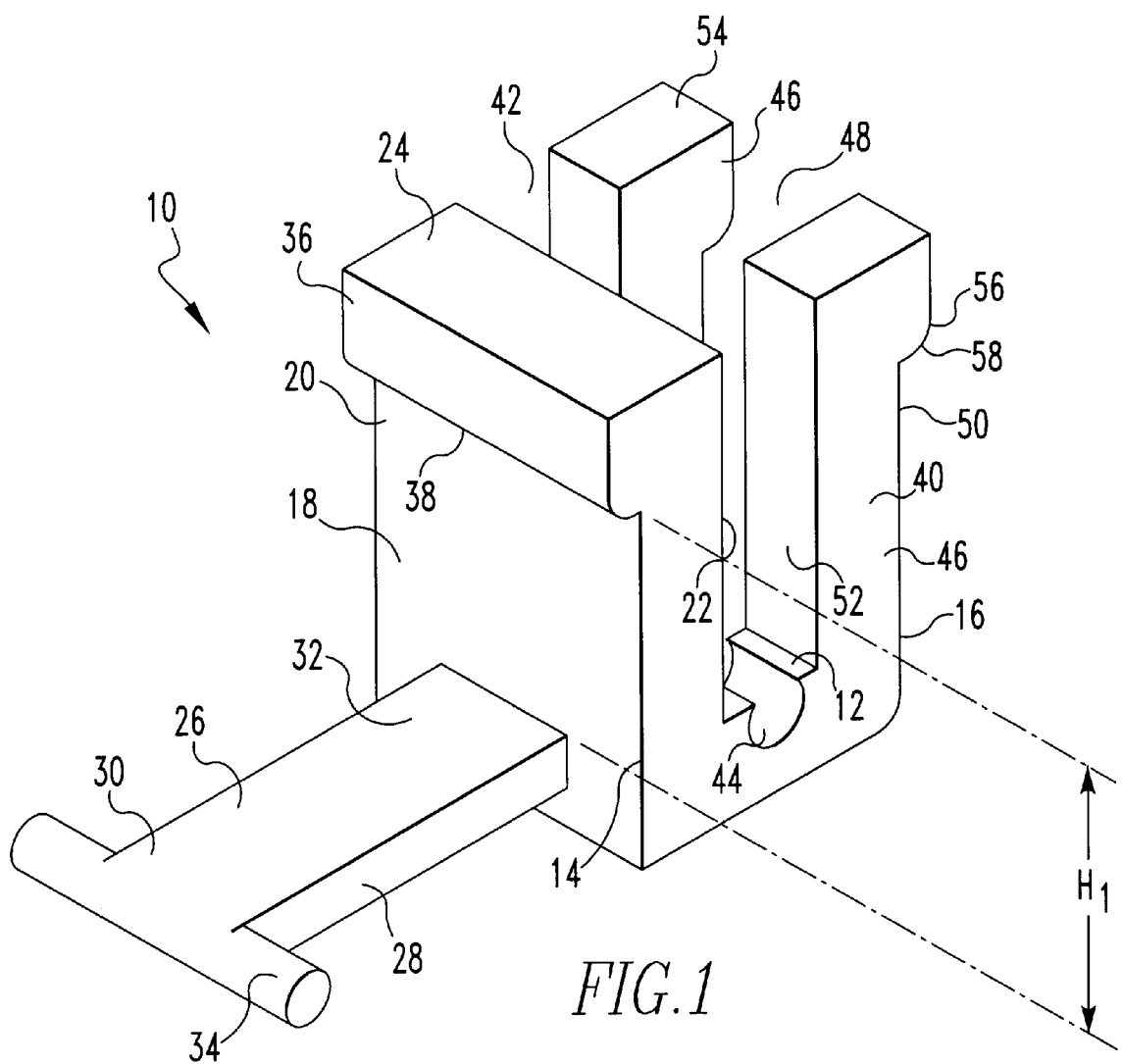
FIG. 1 is a perspective view of a preferred link for carrying an electrical connector in accordance with the present invention.

FIG. 1 shows a preferred conveyor link 10 constructed in accordance with the present invention. The link 10 is adapted to releasably couple or link with two adjacent links, preferably, two links of like kind, to form a carrier chain for releasably receiving and transporting a plurality of elements or parts, such as electrical connectors. The way in which links 10 are coupled together with one another is discussed in more detail below.

Preferably, the link 10 is made of a plastic material and comprises a base portion 12 having a relative first or leading edge 14 and a second or trailing edge 16. A front wall 18 is integral with and extends upwardly from the base portion 12 proximate the leading edge 14. The term "integral," as used herein and throughout the remaining description, is intended to be sufficiently broad to embrace a construction united by such means as fastening, welding, a one-piece construction, and the like. Preferably, the front wall 18 and base portion 12 are of a one-piece construction. The front wall 18 further includes an outside surface 20, inside surface 22, and top surface 24.

A latching arm 26 is integrally coupled to the front wall 18. The location of the latching arm 26 along the outside surface 20 of the front wall 18 may depend on the type of body to which the link 10 is connected or to the type of connector to be transported. Preferably, the latching arm is located proximate the base portion 12. The latching arm 26 is also adapted to support an electrical connector to transport the same from a first station to a second station.

As shown, the latching arm 26 has an elongated body 28 with a distal end 30, proximal end 32, and latching head 34 displaced proximate the distal end 30. The proximal end 32 of the elongated body 28 is integrally connected with the outside surface 20 of the front wall 18. The latching head 34 is adapted to pivotally couple with a second link. The way in which latching head 34 couples with another link and couples with an electrical connector is discussed in more detail below. Preferably, the latching arm 26 and front portion 18 of the link 10 are of a one-piece construction. Preferably, the outside surface 20 of the front portion 18 has a retaining member 36 that is integrally connected proximate the top surface 24. Preferably, the retaining member 36 traverses the width of, and protrudes from surface 20, thereby, forming a shoulder 38 that is adapted to engage a portion of an electrical connector and releasably secure the same. It is noted that the retaining member 36 can be substituted with other attaching embodiments, such as latches, hooks, adhesives, suction, and the like or combinations of the same. Preferably, the retaining member 36 and front portion 18 are of a one-piece construction.

A rear wall or portion 40 is integrally connected with and extends upwardly from the base portion 12 proximate the trailing edge 16. The rear wall 40 is spaced apart from the front portion 18, thereby, defining a gap 42 and cavity 44. Preferably, the cavity 44 is formed to enable a latching head 34 of a second link to be pivotally mounted therein. Preferably, the rear portion 40 is made up of two relatively vertically extending rear wall portions 46 that are spaced apart and parallel to one another to form a slot 48 therebetween. Each one of the rear wall portions 46 has an outside surface 50, inside surface 52, and top surface 54. Preferably, each one of the rear wall portions 46 and base portion 12 are of a one-piece construction.

A rear retaining member 56 is provided on at least one, and preferably both, of the of the rear wall portions 46. The rear retaining member 56 is adapted to contact a surface on an electrical connector to releasably retain the electrical connector between the rear wall portions 46 and an adjacent link. Each one of the rear retaining members 56 is formed integrally with the outside surface 50 of each rear wall 46 proximate the top surface 54. Preferably, each of the retaining members 56 traverses the width of, and protrudes from, the outside surface 50 of each retaining wall 46, thereby, forming rear shoulders 58 that are adapted to engage a portion of an electrical connector. It is also noted that the retaining members 56 can be other fastening members, such as latches, hooks, adhesives, suction, and the like or combinations of the same. Preferably, the rear retaining member 56 and rear wall are a one-piece construction.

Figure 2:
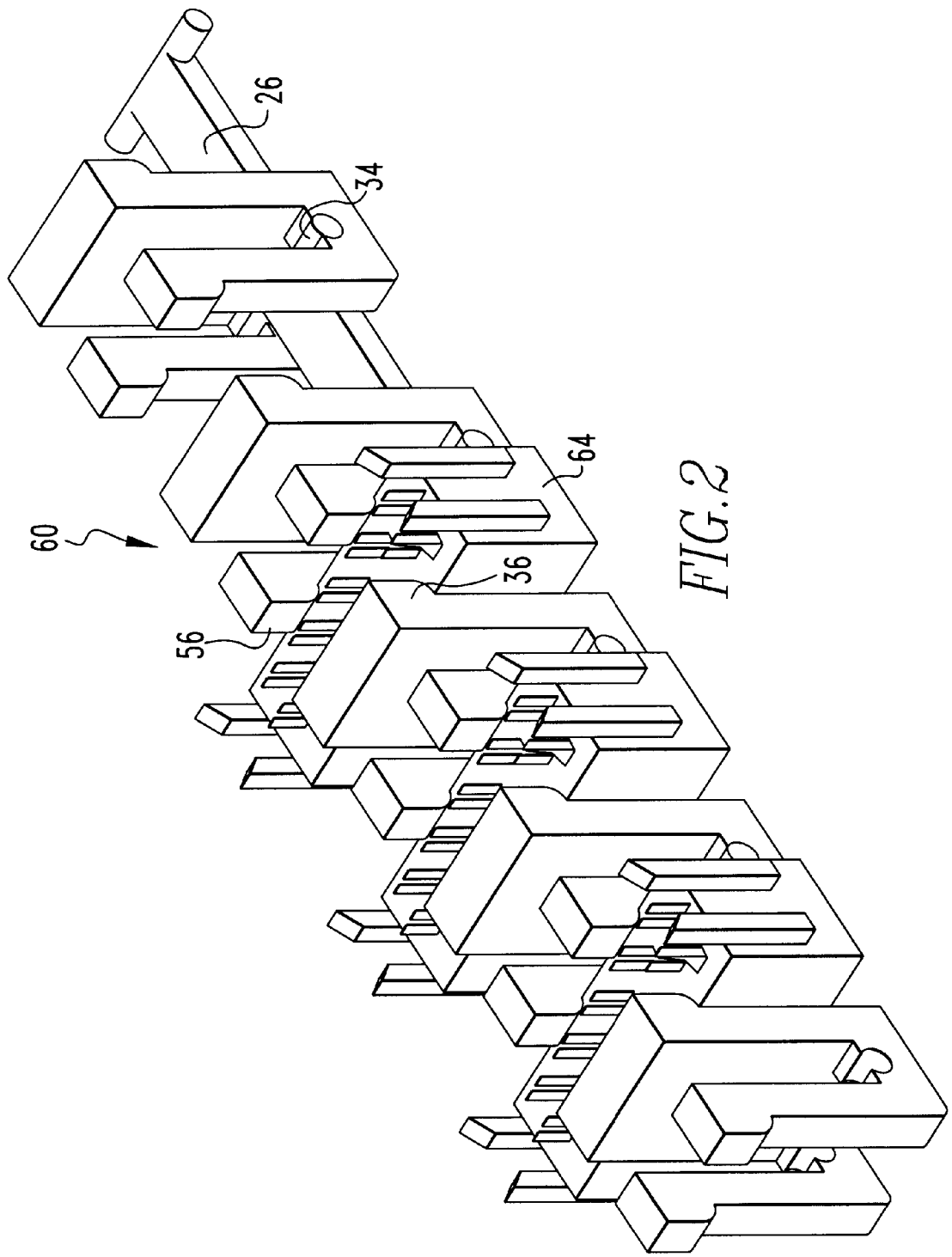
FIG. 2 is a perspective view of a plurality of links shown in FIG. 1 coupled together to form a chain, and leadless electrical connectors loaded thereon.

FIGS. 1 and 2 illustrate the unique manner in which the retaining member 36 and rear retaining members 56 are adapted to contact a surface on an electrical connector 64 and releasably retain the electrical connector 64 in accordance with the present invention. To achieve a proper engagement, it is preferable that the respective height ($H_1$) of the front portion 18 and the height of the rear wall 40 are dimensioned such that there is a close fit between the top of the connector 64 and the retaining member 36 and rear retaining members 56. As illustrated in FIG. 2, the connector 64 fits securely within the space defined by the front wall 18, the retaining member 36 (shoulder 38) and the elongated body 28 of one link, and the outside surface 50 and the rear retaining member 56 (rear shoulder 58) of an adjacent link.

Figure 3:
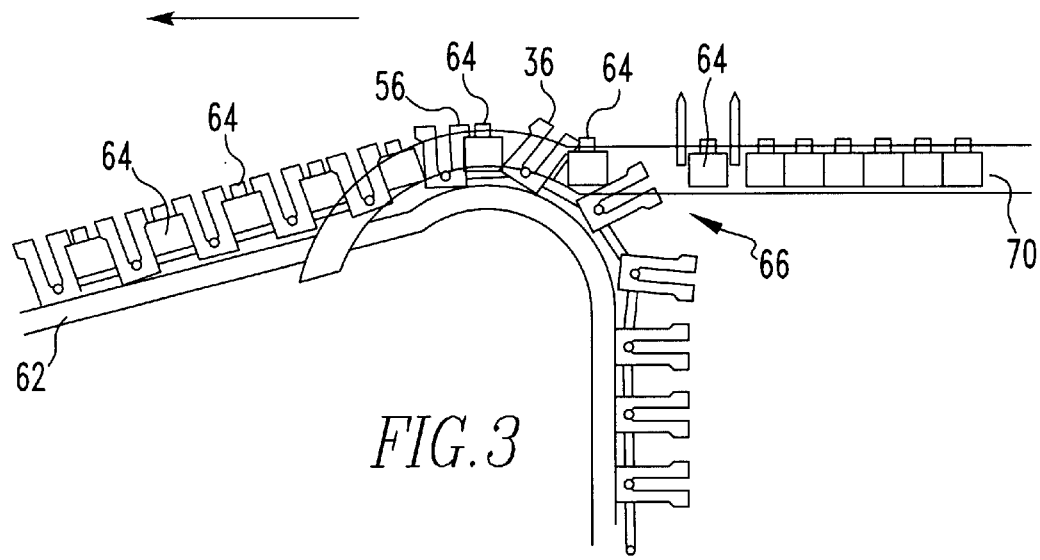
FIG. 3 shows the chain in FIG. 2 being loaded with electrical connectors to transport the electrical connectors from a first station to a vertical magazine.

FIGS. 2 and 3 show a plurality of links 10 of identical construction releasably coupled together to form a chain 60 of desired length to transport electrical connectors 64 from a first station to a second station. As shown, the latching arm 26 of each link 10 extends through slot 48 in an adjacent link. The latching head 34 pivotally fits within cavity 44 of a relatively forward adjacent link to form the chain. Each latching arm 26 is adapted to pivot about the relatively horizontal central axis of its own latching head 34 within the cavity 44. Preferably, each link 10 is releasably coupled to an adjacent link such that if one link is damaged it can be readily replaced. As best shown by FIGS. 1 and 2, the cavity 44 is preferably formed as having a circular arc of greater than 180°. With such a structure, the latching head 34 of one link may be "snapped" into the cavity 44 of an adjacent link. Thus, damaged links may be quickly and easily unsnapped from the chain 60 for replacement.

The chain 60 of links 10 is driven by a conveyor mechanism 62. Chain 60 is adapted to receive a plurality of electrical connectors 64 having generally rectangular cross-sections and to transport them from a first station to a second station (not shown). As the conveyor mechanism 62 rotates, the chain 60 reaches a connector loading station 66 and then a connector unloading station (not shown). A loading or insertion machine 70, working in synchronization with the conveyor, loads at least one connector between each link pair. To this end, the connector is loaded onto the latching arm 26 of one link at the connector loading station 66 with the top surface of the connector engaging front retaining member 36. As the chain 60 is driven, outside surface 50 of the next link contacts the connector and rotates it into position against latching arm 26. In this position the top surface of the connector now also engages rear retaining member 56. In this way, a pair of links 10 engage the electrical connector such that the connector 64 is releasably secured between the front retaining member 36 of one link and the rear retaining member 56 of the other link. As note above, the relative height of the portions of the electrical connector that engage the front and rear retaining portions of each respective link is preferably equal to or slightly higher than the shoulders of each respective retaining member such that a firm fit is achieved to secure the connector therebetween.

Figure 4:
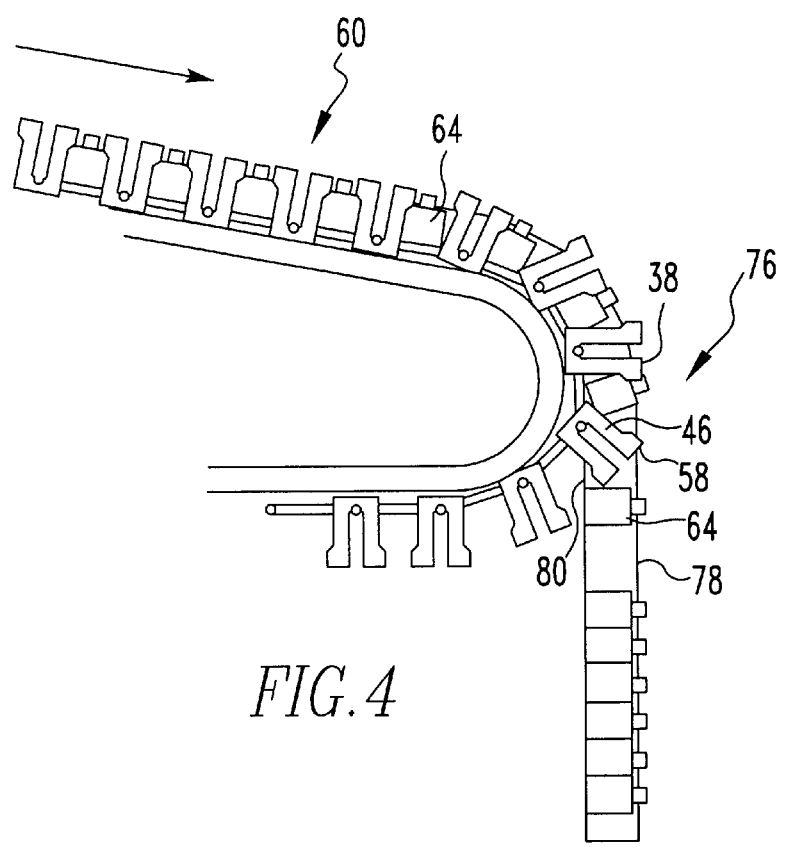
FIG. 4 shows the chain of links shown in FIG. 2 unloading a plurality of connectors is a vertical magazine.
Figure 4A:
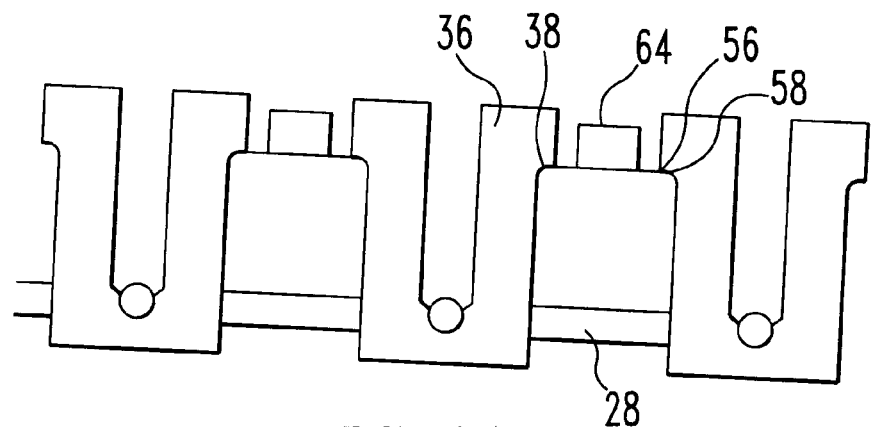
FIGS. 4A and 4B illustrate a portion of the chain of links shown in FIG. 4 at two points during an unloading of a connector.
Figure 4B:
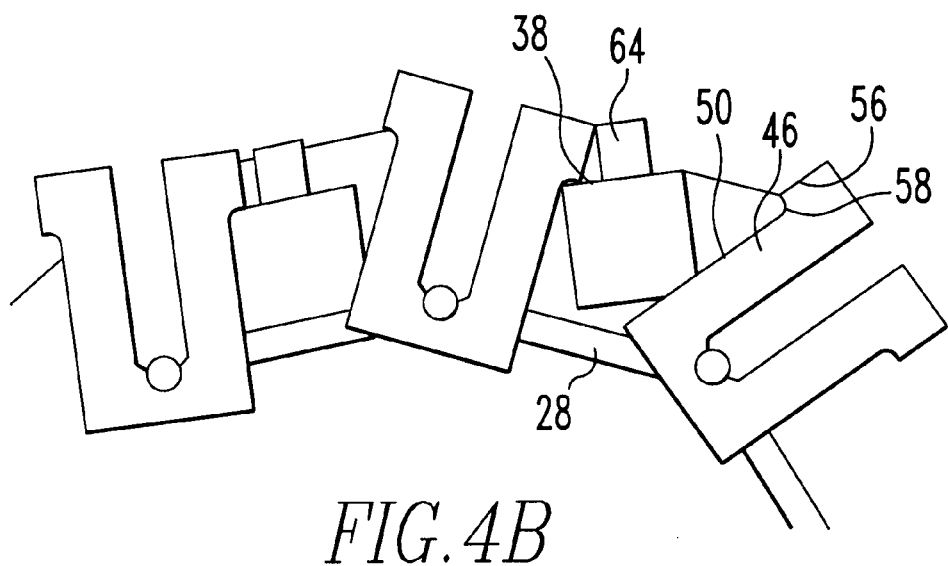

FIG. 4 depicts a portion of connector chain 60 at unloading station 76. At unloading station 76, the connectors 64 are unloaded into a vertical magazine 78. As the conveyor 62 rotates, a pair of links move into a position relative to the connector unloading station. When the connector arrives at the unloading station, the connector 64 is released from the front shoulder 38 of trailing link and the rear shoulders 58 of the leading link such that the connector can be moved past inlet 80 and into magazine 78. As illustrated in FIGS. 4a and 4b, the outside surface 50 of the leading link presses against a lower portion of the connector 64 to rotate the connector 64 against the shoulder 38 of the trailing link within the space defined by the front wall 18, the retaining member 36 (shoulder 38) and the elongated body 28 of the trailing link, and the outside surface 50 and the rear retaining member 56 (rear shoulder 58) of the leading link in the chain 60. As the connector 64 is rotated, the connector 64 is unloaded into the magazine 78 (FIG. 4). After the links are unloaded, they may return to the first position to be reloaded with other connectors. Alternatively, the links may be returned to the connector manufacturer to be repopulated with connectors.

Figure 5:
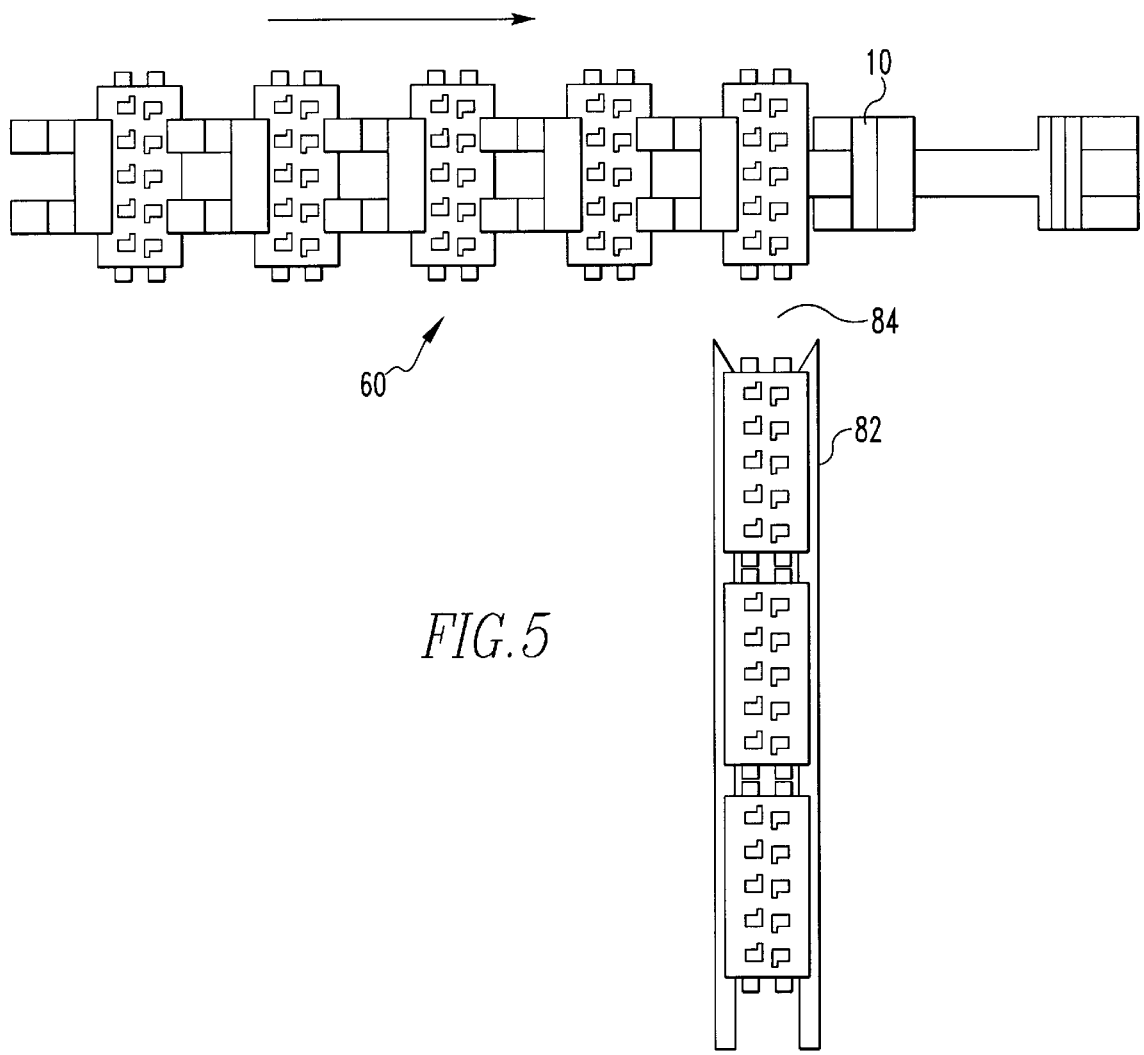
FIG. 5 shows a plurality of links shown in FIG. 1 coupled together to form a chain to transport a plurality of electrical connectors from a first station to a horizontal magazine.

FIG. 5 shows a chain 60 of links 10 that can be employed to load a horizontal magazine 82. In this embodiment, the chain of links 60 is transported along a conveyor 62' from a first loading position (not shown) to a second unloading position. The connectors 64 are loaded in the chain 60 in a similar manner discussed above for the vertical magazine. In the unloading position 76 the connectors are pushed by a plunger (not shown) past the horizontal inlet 84 into magazine 82.

Figure 6:
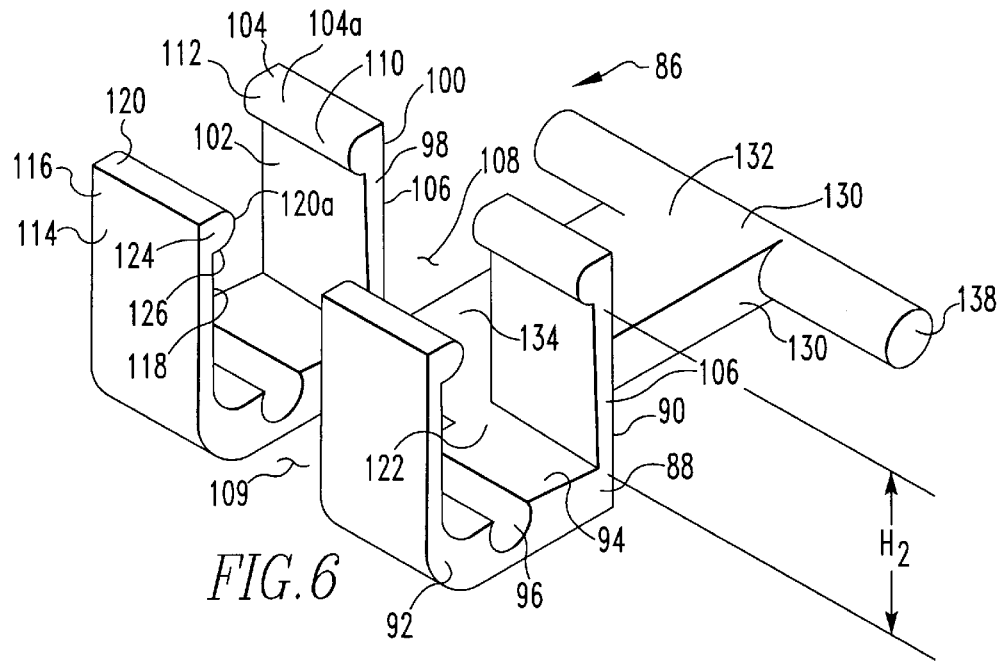
FIG. 6 is a perspective view of a second embodiment of a link in accordance with the present invention.

FIG. 6 shows an alternate embodiment of a link 86 for transporting an electrical connector from a first station to second station. The link 86 comprises a base portion 88 having a first end 90, second end 92, and an upper surface 94 therebetween. The base portion 88 is adapted to pivotally couple with another body, such as a link of like kind. Preferably, the upper surface 94 of the base portion has a cavity 96 formed therein that is similar to the cavity 44 and adapted to permit pivotal attachment to another body, such as a latching member of a link of like kind. The way in which the base portion pivotally couples with another link is discussed in more detail below.

An upwardly extending first wall portion 98 is integrally connected with the base portion 88 proximate the first end 90. The first wall 98 portion has an outside surface 100, inside surface 102, and top surface 104. Preferably, the top surface 104 has a relatively rounded surface 104a so that an electrical connector can easily slide along the surface 104a and into a gap 122 as discussed below. Preferably, the first wall portion 98 comprises two longitudinally upwardly extending wall portion 106 that are spaced apart to form a first slot 108.

Preferably, a first retaining member 110 is integrally connected to the inside surface 102 of the first wall portion 98 proximate the top surface 104. Preferably, each of the first upwardly extending wall portion 106 are provided with a like retaining member 110. The first retaining member 110 is contact the surface of an electrical connector and releasably retain the electrical connector between the first wall portion 98 and second wall portion 114 (discussed below). Preferably, the first retaining member 110 traverses the width of, and protrudes from, the inside surface 102, thereby, forming a shoulder 112 that is adapted to engage a portion of an electrical connector and releasably secure the same. It is noted that the relative height of the first wall portion 98 and first retaining member 110 may vary depending on particular connector dimensions. It is also noted that the first retaining member 110 can be substituted with other attaching embodiments, such as latches, hooks, adhesives, suction, and the like or combinations of the same. Preferably, the first wall portion and first retaining member are of a one-piece construction.

A upwardly extending second wall portion 114 is integrally connected with the base portion 88 proximate the second end 92. Preferably, the second wall portion 114 comprises two longitudinally upwardly extending wall portion to form a second slot 109. Preferably, the second slot 109 is adapted to enable a latching member of an adjacent link to pass therethrough to be coupled within the cavity 96. The second wall portions 114 have an outside surface 116, inside surface 118, and top surface 120. The second wall portions 114 are spaced from the first wall portion, thereby, defining a gap 122 that is adapted to releasably receive a connector. Preferably, the top surface 120 has a relatively rounded-off surface 120a to enable a connector to easily be positioned within the gap 122.

Preferably, a second retaining member 124 is integrally connected to the inside surface 118 of the second wall portion 114 proximate the top surface 120. Preferably, each of the second upwardly extending walls 115 are provided with a like retaining members 124. The second retaining member 124 is adapted to communicate with an electrical connector and releasably retain the electrical connector between the inside surface 102 of the first wall portion 98 and the inside surface 118 of the second wall portion 114. Preferably, the second retaining member 124 traverses the width of, and protrudes from, the inside surface 118, thereby, forming a shoulder 126 that is adapted to engage a portion of an electrical connector and releasably secure the same. It is noted that the relative height of the second wall portion 114 and second retaining member 124 may vary depending of the particular connector dimensions. It is also noted that the second retaining member 124 can be substituted with other attaching embodiments, such as latches, hooks, adhesives, suction, and the like or combinations of the same. Preferably, the second wall portion and second retaining member are of a one-piece construction.

Preferably, the relative height of the portions of the electrical connector that engage the first retaining member 110 and second retaining member 124 is equal to or slightly higher than the height ($H_2$) of the shoulders of each respective wall portion such that a firm fit is achieved to secure the connector therebetween.

A relatively longitudinally extending latching arm 130 for pivotally coupling with an adjacent link is provided. The latching arm 130 has an elongated body 132 having a proximal end 134 and distal end 136. The proximal end 134 of the elongated body 132 is integrally connected with, and protrudes from, the outside surface 100 of the first wall portion 98. A latching head 138 is integrally connected to the body 132 proximate the distal end 136 of the latching arm 130. The latching head 138 is adapted to pivotally couple with another body, such as a link of like kind, to form a chain for transporting at least one electrical connector. The way that the latching head performs this function is discussed in more detail below.

Figure 7:
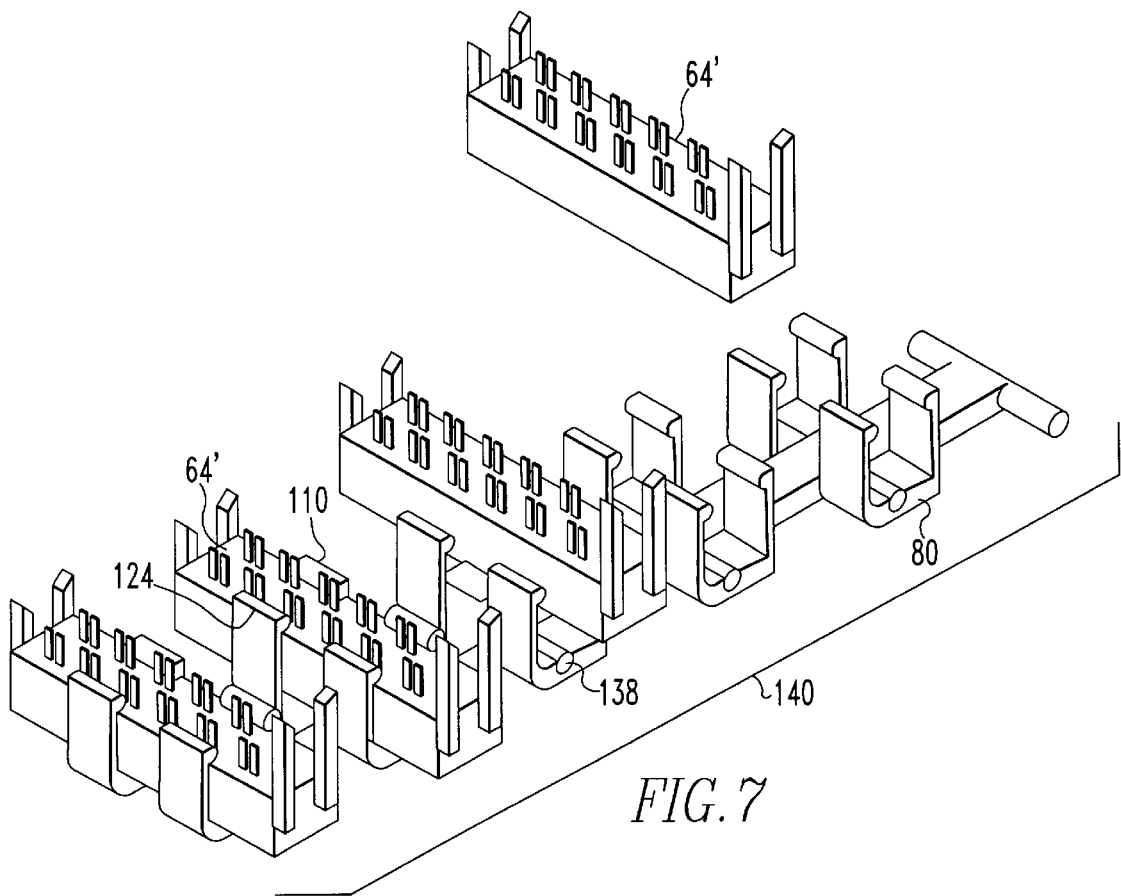
FIG. 7 is a perspective view of a plurality of links shown in FIG. 6 coupled together to form a chain to transport electrical connectors from a first position to a second position.

In FIG. 7, a plurality of links 86 of identical construction are pivotally linked together to form a chain 140 of desired length to transport electrical connectors 64' from a first station to a second station. Corresponding connectors 64' have been positioned between the first wall portion 98 and second wall portion 114. Each connector 64' is releasably secured between the wall portions 98 and 114 by the first retaining member 110 second retaining member 124. As shown, the latching arm 130 of each link 86 is placed through the slot 109 with the latching head 138 disposed within the cavity 96 of a relatively forward adjacent link to form the chain. Each latching arm 130 is adapted to pivot about the relatively horizontal central axis of its own latching head 138 within the cavity 96. Preferably, each link is releasably linked to an adjacent link such that if one link is damaged it can be readily replaced.

The chain 140 of links 86 is adapted to be driven by a conveyor mechanism and to receive a plurality of electrical connectors 64' having a generally rectangular cross-section and transport them from a first station to a second station. As the conveyor rotates, the chain 140 reaches a first or connector loading station wherein the connector 64' is loaded within the gap 122 between the inner surface 102 of the first wall 98 and the inner surface 118 of the second wall 114. At the unloading station, the electrical connector is released from the grip of the retaining members 112 and 126, and in turn, pushed out of the gap 122 by a means to push the connector 64' (not shown) from the grip of the retaining members 112 and 126 to unload the connector 64' into the magazine 82.

Figure 8:
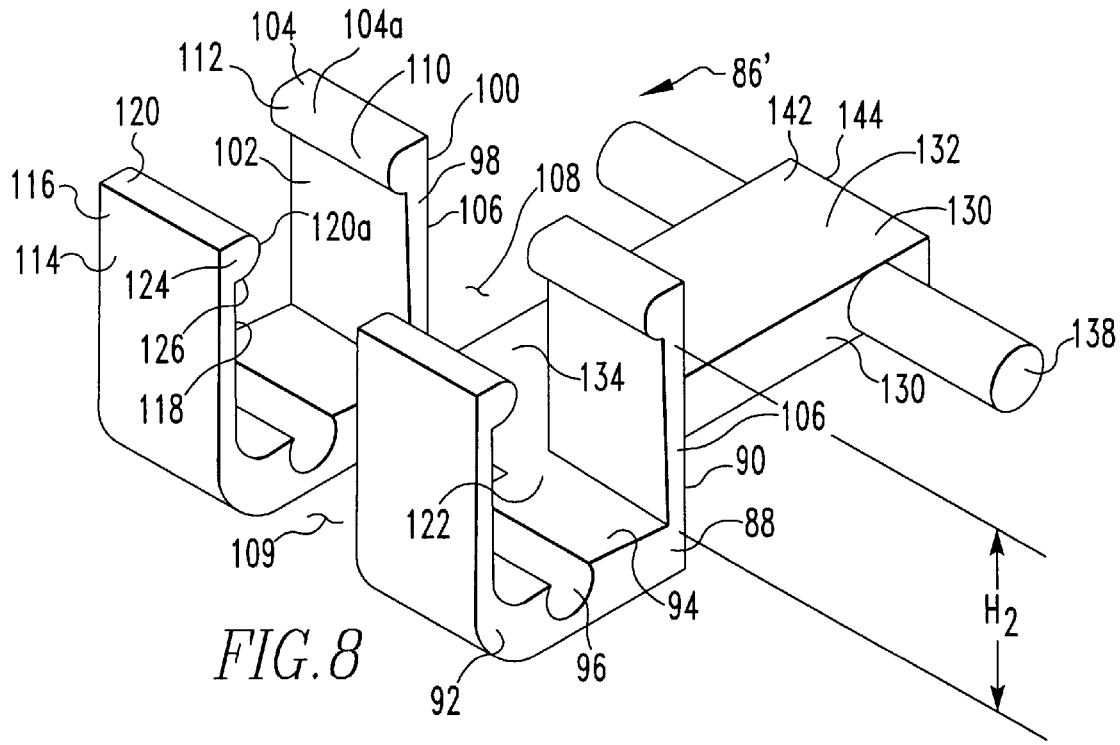
FIG. 8 is a perspective view of a third embodiment of links in accordance with the invention.

FIG. 8 depicts another alternate embodiment of a link 86' for transporting an electrical connector from a first station to second station. Like features of the embodiments of FIGS. 6 and 8 are indicated by the same reference numerals, and accordingly, will not be described herein again. However, as shown in FIG. 8, the latching arm 130 of the link 86' is provided with an extending portion 142 that extends outward from the latching head 138 to a distal edge 144.

Figure 9:
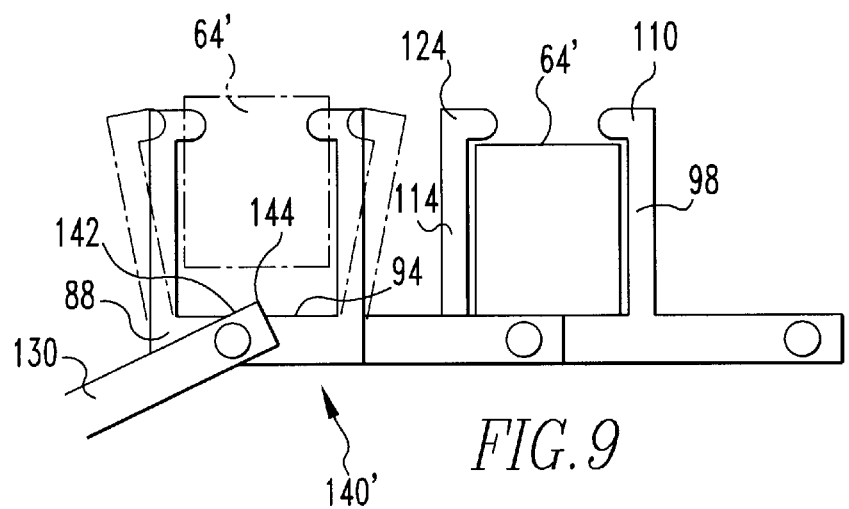
FIG. 9 is a side view of adjacent links of the type shown in FIG. 8, illustrating ejection of a part from one of the links.

As shown in FIG. 9, a plurality of links 86' of identical construction may be pivotally linked together to form a chain 140' of desired length to transport electrical connectors 64' from a first station to a second station. Corresponding connectors 64' are positioned between the first wall portion 98 and second wall portion 114. Each connector 64' is releasably secured between the wall portions 98 and 114 by the first retaining member 110 second retaining member 124. The chain 140' has similar characteristics as the chain 140 described with reference to FIG. 7. As shown in FIG. 9, the connector 64' is released from the link 86' as the latching arm 130 of an adjacent link 86' rotates within the cavity 96 of the link 86'. The rotation of the latching arm 130 causes the distal edge 144 of the extending portion 142 to be placed into contact with the bottom surface of the connector 64'. This contact forces connector 64' upward in a direction away from the upper surface 94 of the base portion 88, which in turn, forces the first wall portion 98 and second wall portion 114 of link 86' outward to release the connector 64' into the inlet of a magazine. Thus, this embodiment does not require the pushing means for unloading connectors mentioned in connection with the FIG. 6 embodiment.

Figure 10:
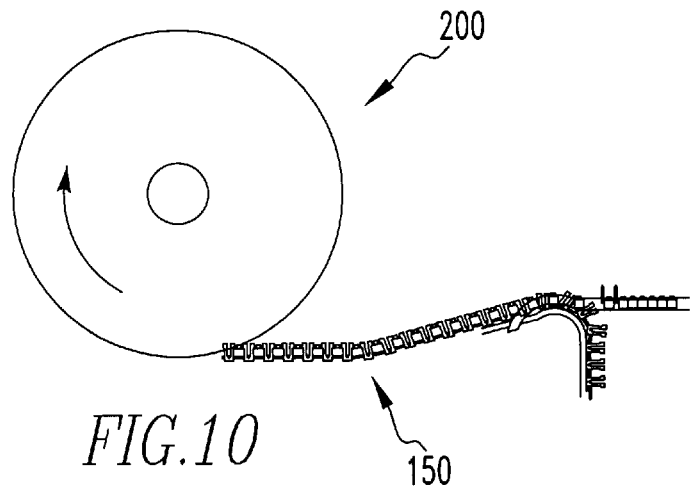
FIG. 10 is a side view of a reeling operation for forming a package of a connector-loaded chan.
Figure 11:
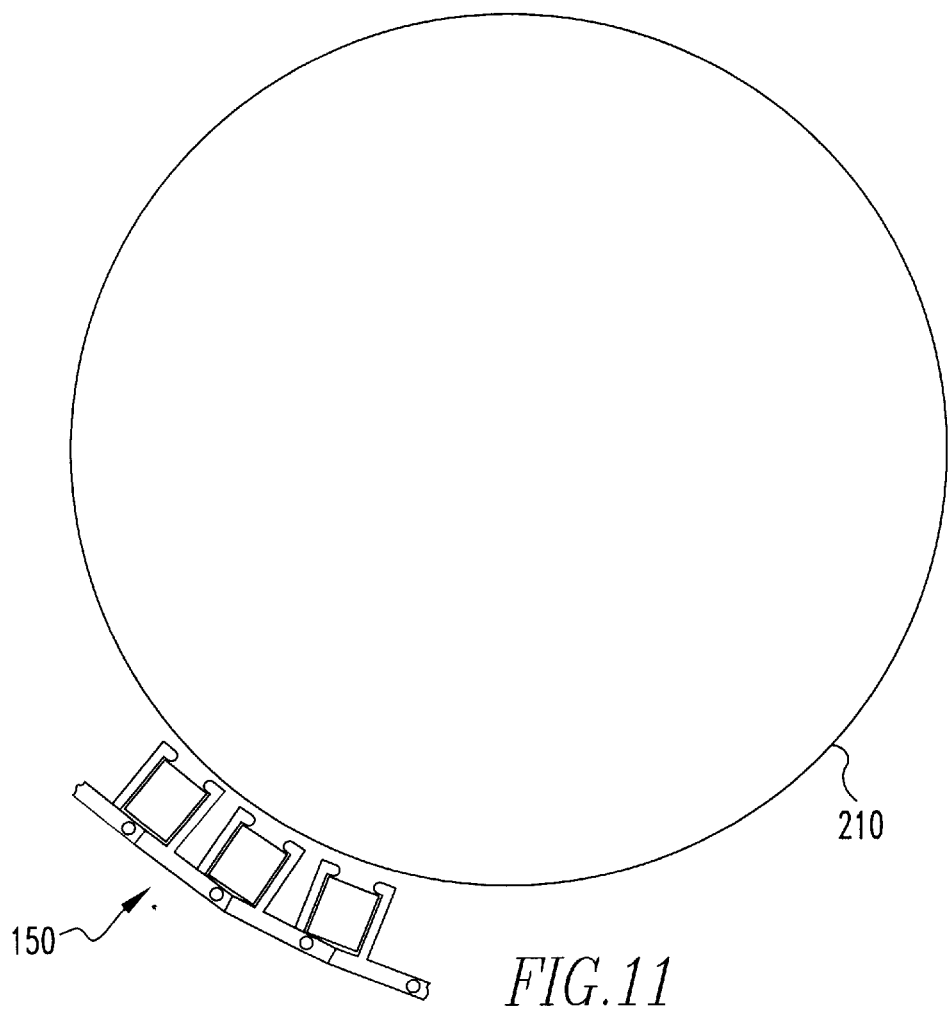
FIG. 11 is a fragmented view of the reel of FIG. 10.

FIG. 10 shows a chain 150 of links populated with connectors being wound onto a reel 200 that has a central hub 210 and an opposed pair of outside flanges. After the links are wound on the reel 200, the reel is then packaged and shipped to the user. FIG. 11 illustrates the form the links take as they are wound onto the hub 210 of the reel. The links are received on the reel 200 with the top surfaces of the links facing toward the hub. Winding in this fashion helps in holding the connectors in the links because the walls of links close about the connectors.

The links in accordance with the present invention provided several advantages. One advantage is that an adhesive-layered substrate no longer is required to load magazines. Because adhesive layered substrates are no longer employed no adhesive residue will be on the connectors contact area to either render the electrical connectors useless or cause the connectors to stick together and jam the magazine. A further advantage is that the links, and chains formed by the links, may be reused by reloading the chains with new connectors after unloading.

Thus, the links can be used as a part of the packaging for connectors by a connector manufacturer. Connector-loaded chains can be supplied by the manufacturer to the user, for example, in reeled form that are utilized to load application machines. The unloaded chains can then be recycled to the manufacturer or reloaded.

Another advantage is that the magazines may not have to be manually loaded with connectors, thereby preventing the from being damaged by a handler as the connectors are loaded into a magazine. Additionally, the time required to load and reload a magazine may be reduced, thereby, reducing the overall costs this task.

The present invention may be employed in other specific forms without departing from the spirit or essential attributes thereof. For example, any number of materials may be used in manufacturing the disclosed latch member. While the invention has been described and illustrated with reference to specific embodiments, those skilled in the art will recognize that modification and variations may be made without departing from the principles of the invention as described hereinabove and set forth in the following claims.

What is claimed:

1. A conveyor link adapted to movably couple with a second conveyor link to form a link pair, said conveyor link comprising:

a base portion having a first end and a second end, said base portion having structure to moveably couple with said second conveyor link;

a first wall portion integrally connected with and extending upwardly from said base portion proximate said first end, said first wall portion adapted to contact a first electrical connector;

a latching arm integrally connected with and protruding from the first wall portion, said latching arm having structure to movably couple with a third conveyor link; and a second wall portion integrally connected with and extending upwardly from said base portion proximate said second end, said second wall portion adapted to contact a second electrical connector, wherein said link pair releasably receives and transports an electrical connector.

2. The link recited in claim 1, wherein said second wall portion defines a slot, and wherein said second wall portion is spaced from the front wall thereby defining a gap for pivotally receiving a latching arm of the second link.

3. The link recited in claim 1, further comprising a first retaining member integrally formed with the first wall portion, said first retaining member adapted to communicate with an electrical connector and releasably retain the electrical connector between the first wall portion and the second link.

4. The link recited in claim 1, further comprising a second retaining member integrally formed with the second wall portion, said second retaining member adapted to communicate with an electrical connector to releasably retain the second electrical connector between said second wall portion and the third link.

5. The link recited in claim 2, wherein said gap between said first wall portion and second wall portion defines a cavity that is adapted to pivotally receive a latching arm of another link.

6. The link recited in claim 5, wherein the latching arm of another link is adapted to pivotally fit within said cavity.

7. The link recited in claim 1, wherein the second link is pivotally connected within said base of said link, and wherein said latching arm of said link is pivotally connected to the third link to form a chain.

8. The link recited in claim 1, wherein said link pair releasably receives and transports said first electrical connector within a gap defined by a first retaining member integrally formed with the first wall portion of said link, the first wall portion of said link, said latching arm of said link, a second retaining member integrally formed with the second wall portion of the second link, and the second wall portion of the second link, and
  wherein a height of the electrical connector is equal to or slightly higher than a shoulder of each of the first and second retaining members such that a firm fit is achieved to secure the connector.

9. A link adapted to be connected to at least one other link to form a chain, said link comprising:
  a base portion having a first end and a second end, said base defining a cavity;
  a first wall portion integrally connected with and extending upwardly from said base portion proximate said first end, said first wall portion having an outside surface, an inside surface, and a top surface;
  a second wall portion integrally connected with and extending upwardly from said base portion proximate said second end, said second wall portion spaced from said first wall portion defining a gap therebetween, said second wall portion having an inside surface, an outside surface, and a top surface; and
  a latching arm integrally connected with, and protruding from, the outside surface of said first wall portion, said latching arm comprising a latching head.

10. The link recited in claim 9, wherein said second wall portion further defines a slot for receiving a latching arm of the at least one link to pass therethrough.

11. The link recited in claim 10, wherein said cavity is adapted to pivotally friction fit with the latching arm of the at least one other link.

12. The link recited in claim 9, further comprising a first retaining member integrally formed with the first wall portion.

13. The link recited in claim 9, further comprising a second retaining member integrally formed with the second wall portion.

14. The link recited in claim 9, wherein the at least one other link is pivotally connected within said base of said link, and wherein said latching arm of said at least one other link is pivotally connected to a third link to form a chain.

15. The link recited in claim 9, wherein said first wall portion comprises a plurality of first wall portions integrally connected with and extending upwardly from said base portion proximate said first end, said first walls having an outside surface, an inside surface, and a top surface, respectively, and
  said second wall portion comprises a plurality of second wall portions integrally connected with and extending upwardly from said base portion proximate said second end, said second wall portions spaced from respective first wall portions defining a gap therebetween, said second wall portions having an inside surface, an outside surface, and a top surface, respectively.

16. The link recited in claim 15, wherein a slot is defined between adjacent second wall portions, said slot receiving a latching arm of the at least one link to pass therethrough.

17. The link recited in claim 15, wherein a slot is defined between adjacent first wall portions.

18. The link recited in claim 15, wherein each of said first wall portions further comprises an integrally formed first retaining member.

19. The link recited in claim 15, wherein each of said second wall portions further comprises an integrally formed second retaining member.

20. The link recited in claim 15, wherein said latching arm further comprises an extending portion which extends outward from said latching head.

21. The link recited in claim 20, wherein a slot is defined between adjacent second wall portions, said slot receiving a latching arm of the at least one link to pass therethrough.

22. A connector conveyor chain, comprising:
  a plurality of conveyor links, each of said plurality of links comprising:
    a base portion having a first end and a second end, said base portion having structure to moveably couple with a first adjacent conveyor link;
    a first wall portion integrally connected with and extending upwardly from said base portion proximate said first end;
    a latching arm integrally connected with and protruding from the first wall portion, said latching arm having structure to movably couple with an adjacent conveyor link; and
    a second wall portion integrally connected with and extending upwardly from said base portion proximate said second end; and
  a plurality of electrical connector connectors,
  wherein a pair of conveyor links releasably receives and transports one of said plurality of electrical connectors within a gap defined by the first wall portion of one of said pair of links, said latching arm of said one of said pair of links, and the second wall portion of the other of said pair of links.

23. The connector conveyor chain recited in claim 22, further comprising a first retaining member integrally formed with the first wall portion, said first retaining member adapted to communicate with said one of said plurality of electrical connectors and releasably retain said one of said plurality of electrical connectors between the first wall portion and said adjacent link.

24. The connector conveyor chain recited in claim 22, further comprising a second retaining member integrally formed with the second wall portion, said second retaining member adapted to communicate with said one of said plurality of electrical connectors to releasably retain said one of said plurality of electrical connectors between said second wall portion and an other adjacent conveyer link.

25. The connector conveyor chain recited in claim 22, wherein said link pair releasably receives and transports said electrical connector within a gap defined by a first retaining member integrally formed with the first wall portion of one of said plurality of links, the first wall portion of one of said plurality of links, said latching arm of one of said plurality of links, a second retaining member integrally formed with the second wall portion of an adjacent one of said plurality of links, and the second wall portion of an adjacent one of said plurality of links;

wherein a height of the electrical connector is equal to or slightly higher than a shoulder of each of the first and second retaining members such that a firm fit is achieved to secure the connector.

26. The connector conveyor chain recited in claim 22, wherein said chain is adapted to be driven by a conveyor mechanism.

27. A conveyor link adapted to movably couple with a second conveyor link, said conveyor link comprising:

a base portion having a first end and a second end, said base portion having structure to moveably couple with said second conveyor link;

at least one first wall portion integrally connected with and extending upwardly from said base portion proximate said first end, said at least one first wall portion adapted to contact an electrical connector;

a latching arm integrally connected with and protruding from the first wall portion, said latching arm having structure to movably couple with said second conveyor link; and at least one second wall portion integrally connected with and extending upwardly from said base portion proximate said second end, said at least one second wall portion adapted to contact the electrical connector, wherein said conveyor link releasably receives and transports an electrical connector between said at least one first wall portion and said at least one second wall portion.

28. The link recited in claim 27, further comprising a first retaining member integrally formed with said at least one the first wall portion, said first retaining member adapted to communicate with an electrical connector and releasably retain the electrical connector between said at least one first wall portion and said at least one second wall portion.

29. The link recited in claim 27, further comprising a second retaining member integrally formed with said at least one second wall portion, said second retaining member adapted to communicate with an electrical connector to releasably retain the second electrical connector between said at least one second wall portion and said at least one first wall portion.

30. The link recited in claim 27, wherein a gap is defined between said first wall portion and second wall portion, and said base portion defines a cavity that is adapted to pivotally receive a latching arm of another link.

31. The link recited in claim 27, wherein said link releasably receives and transports said first electrical connector within a gap defined by a first retaining member integrally formed with said first wall portion, said first wall portion, said latching arm, a second retaining member integrally formed with said second wall portion, and said second wall portion of said link, and wherein a height of the electrical connector is equal to or slightly higher than a shoulder of each of the first and second retaining members such that a firm fit is achieved to secure the connector.

32. The link recited in claim 27, wherein said latching arm further comprises an extending portion which extends outward from said latching head.

33. A connector package, comprising:

a plurality of links forming a length of chain, each of the links including structure for releasably engaging an adjacent link;

latch structure for retaining an electrical connector; and a plurality of electrical connectors discrete from the links, each of the connectors being retained by the latch structure of a corresponding one of the links.

34. The connector package recited in claim 33, wherein each of said plurality of links comprises a base portion having a first end and a second end, a first wall portion integrally connected with and extending upwardly from said base portion proximate said first end, a latching arm integrally connected with and protruding from the first wall portion to movably couple with an adjacent one of said plurality of links, and a second wall portion integrally connected with and extending upwardly from said base portion proximate said second end, and wherein said structure comprises said first wall portion and said second wall portion which is adapted to releasably receive and transport said electrical connector.

35. The link recited in claim 34, wherein said second wall portion defines a slot and said base defines a cavity, wherein said second wall portion is spaced from the front wall thereby defining a gap for pivotally receiving a latching arm of said adjacent one of said plurality of links within said cavity.

36. The link recited in claim 34, further comprising a first retaining member integrally formed with the first wall portion, said first retaining member adapted to communicate with said electrical connector and releasably retain said electrical connector.

37. The link recited in claim 34, further comprising a second retaining member integrally formed with the second wall portion, said second retaining member adapted to communicate with said electrical connector to releasably retain said electrical connector.

38. The link recited in claim 34, wherein a height of said electrical connector is equal to or slightly higher than a shoulder of each of said plurality of links such that a firm fit is achieved to secure the connector.

39. A connector package, comprising:

a plurality of links forming a length of chain, each of the links including:

a base portion having a first end and a second end;

a first wall portion integrally connected with and extending from said base portion proximate said first end;

a latching arm integrally connected with and protruding from said first wall portion to movably couple with an adjacent one of said plurality of links;

a second wall portion integrally connected with and extending from said base portion proximate said second end; and structure for releasably engaging an adjacent link; and a plurality of electrical connectors;

wherein said first wall portions and said second wall portions of said links releasably receive and transport said electrical connectors.

* * * * *